T. GALT & J. BLAISDELL.
CHILDREN'S CARRIAGES.
No. 171,370.  Patented Dec. 21, 1875.
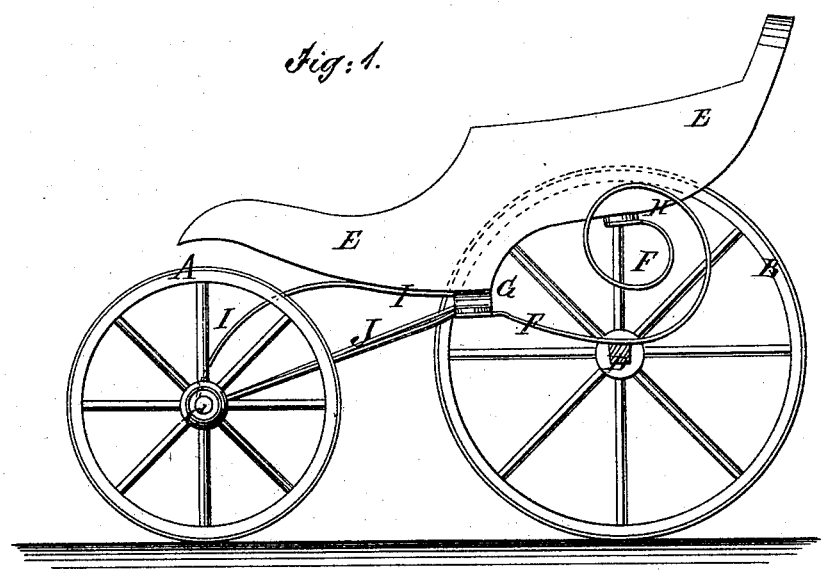
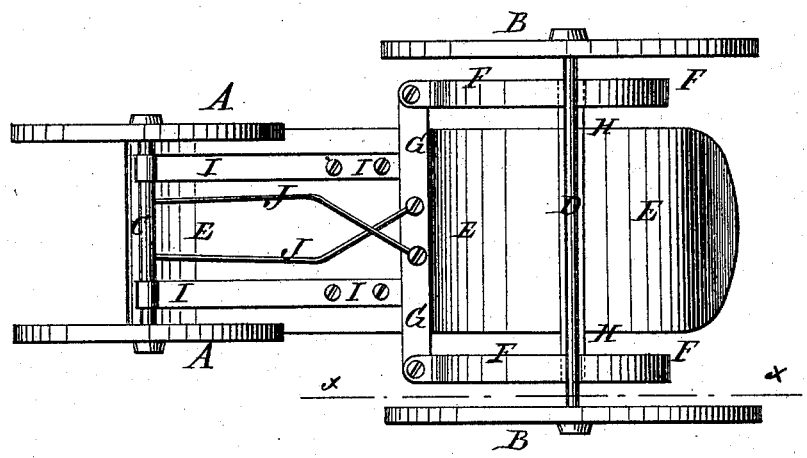

UNITED STATES PATENT OFFICE.

THOMAS GALT AND JAMES BLAISDELL, OF ROCK ISLAND, ILLINOIS.

IMPROVEMENT IN CHILDREN'S CARRIAGES.

Specification forming part of Letters Patent No. 171,370, dated December 21, 1875; application filed September 4, 1875.

*To all whom it may concern:*

Be it known that we, THOMAS GALT and JAMES BLAISDELL, of Rock Island, in the county of Rock Island and State of Illinois, have invented a new and useful Improvement in Child's-Carriage Gearing, of which the following is a specification:

Figure 1 is a side view of a child's carriage to which our improved gearing has been applied, partly in section through the line *x x*, Fig. 2. Fig. 2 is a bottom view of the same.

Similar letters of reference indicate corresponding parts.

The object of this invention is to furnish an improved child's carriage, which shall be so constructed that the body of the carriage may be hung between the coiled springs.

The invention consists in the combination of the coiled springs, the cross bars or springs, and the forward springs with the body and axles of the carriage; in the combination of the reach with the forward axle, the forward cross bar or spring, and the body of the carriage; in a child's carriage in which the springs are so arranged that the body of the carriage may be placed upon a cross-bar inside of the said springs; and in a child's carriage so arranged that the reach may connect the body of said carriage with the forward axle, as hereinafter fully described.

A are the forward wheels. B are the rear wheels. C is the forward axle. D is the rear axle, and E is the body of the carriage, about the construction of which parts there is nothing new. F are the coiled springs, which are attached to the rear axle D at a little distance from the outer ends of the coils, and at a distance apart greater than the width of the carriage-body E. The outer ends of the coils F extend forward, and are attached to the projecting ends of the cross spring or bar G, attached to the middle part of the bottom of the body E. The inner ends of the coils F are attached to the projecting ends of the cross spring or bar H, attached to the rear part of the bottom of the body E. The cross-bars G H may be rigid; but we prefer to make them elastic, as giving greater elasticity to the carriage. I are the forward springs, the forward ends of which are attached to the forward axle C, and their rear ends are attached to the middle part of the bottom of the body E. J is the reach, which is formed of two rods, the forward ends of which are attached to the forward axle C. The rods J pass back parallel with each other nearly to their rear ends, where they are bent inward across each other, and their ends are attached to the cross bar or spring G, and to the body E.

I am aware that the cross-bar, body-loops, cross-spring, and coil have been placed behind and beneath the body, thus throwing the whole weight in front of the rear axle, bringing too much strain upon the handles, and requiring too much exertion on the part of the operator to keep the carriage in a straight line, or to enable it to be easily tipped in overcoming an obstruction, or in making a turn.

The great advantage and object of our peculiar form of reach is to enable us to apply steel sills to the front axle without a cumbersome and unsightly gearing.

Having thus described our invention, we claim as new and desire to secure by Letters Patent—

1. The body of a child's carriage, suspended on cross-bars between springs F F, and balanced over the rear axle, as shown and described, so that a slight pressure will tip it either forward or backward, and thus enable the vehicle to be easily operated by a child.

2. In a child's carriage, the double reach J J, with forward ends attached to front axle, and the rear crossed ends fastened to crossbar G, as shown and described.

THOS. GALT.
JAMES BLAISDELL.

Witnesses:
DAVID HAWES,
J. R. HEEBER.